US005128157A

United States Patent [19]
Ruiz

[11] Patent Number: 5,128,157
[45] Date of Patent: * Jul. 7, 1992

[54] FRAGILE FOOD PRODUCT PACKAGE

[76] Inventor: Mark R. Ruiz, P.O. Box 28139, Santa Ana, Calif. 92799

[ * ] Notice: The portion of the term of this patent subsequent to Oct. 10, 2006 has been disclaimed.

[21] Appl. No.: 608,166

[22] Filed: Oct. 31, 1990

[51] Int. Cl.⁵ .......................................... A21D 13/00
[52] U.S. Cl. .................................. 426/106; 426/124; 426/128; 426/138; 426/396; 206/497; 206/499
[58] Field of Search ............... 426/128, 124, 396, 138, 426/106; 206/499, 497

[56] References Cited

U.S. PATENT DOCUMENTS

| | | | |
|---|---|---|---|
| 1,326,519 | 12/1919 | McLaren | 206/499 |
| 1,326,520 | 12/1919 | McLaren | 206/499 |
| 1,722,338 | 7/1929 | Papendick | 426/124 |
| 3,212,907 | 10/1965 | Caprioli | 426/124 |
| 4,299,850 | 11/1981 | Wallen et al. | 426/124 |
| 4,349,571 | 9/1982 | Davis et al. | 426/128 |
| 4,381,837 | 5/1983 | Cortopassi | 426/124 |

*Primary Examiner*—Jeanette Hunter
*Assistant Examiner*—Mary S. Mims
*Attorney, Agent, or Firm*—Roger A. Marrs

[57] ABSTRACT

A food product package is disclosed for packing a plurality of fragile shells or bowls composed of a consumable and digestible material consisting of a circular base joining in a continuous circular sidewall having a plurality of evenly spaced semicircular convolutions wherein each convolution is of the same diameter to provide combined or over-all strength. The shell or bowl composition presents a textured exterior surface visually indicative of an edible product. The textured surface is characterized as being granular having a wall thickness and cross-section which is brittle and capable of being broken apart for ready consumption. The plurality of shells or bowls are nested together in a stack confined between opposing inner surfaces of a U-shaped, load carrying protective form captured in a unitary package by a wrap of plastic film. The protective form includes elongated sidewalls projecting from opposite ends of a base on which the stack rests. The sidewalls are of greater length than the height of the stack so that terminating end portions extend beyond the stack height in position to receive and absorb impact loads and shocks to the exclusion of the stack.

7 Claims, 2 Drawing Sheets

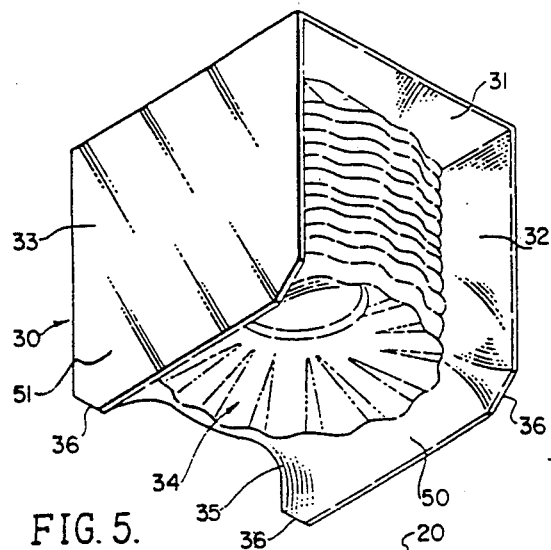
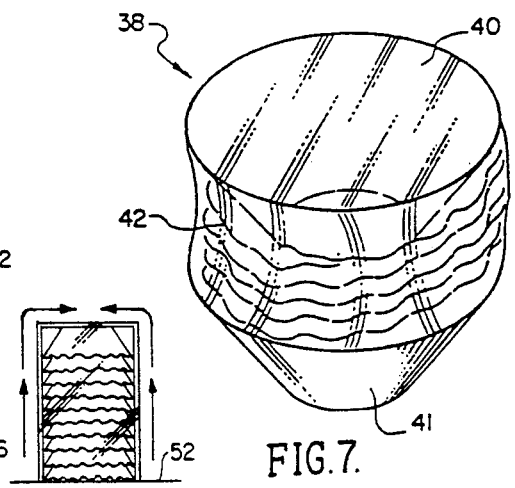
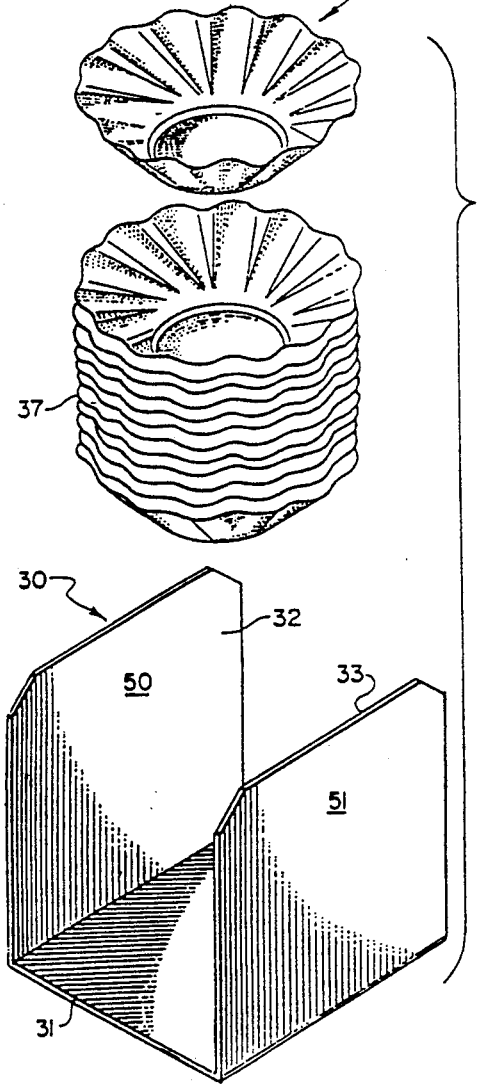
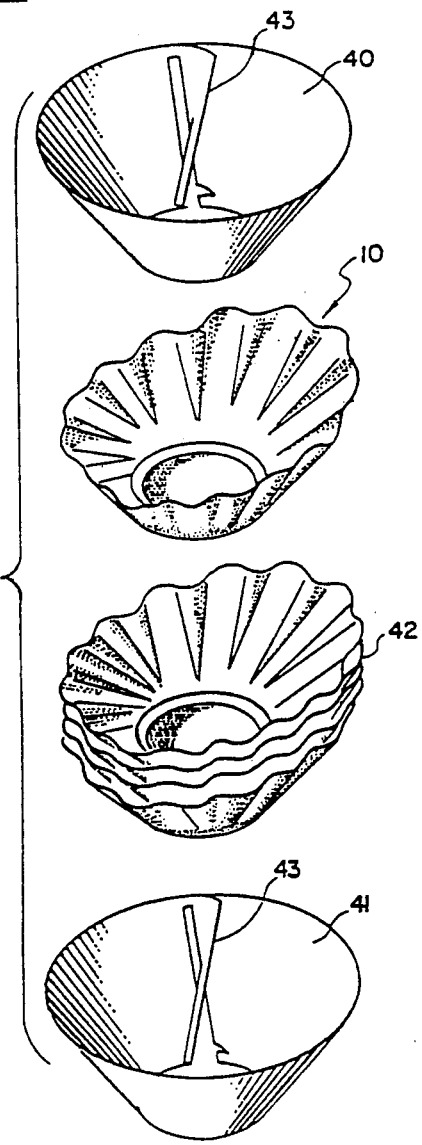

FRAGILE FOOD PRODUCT PACKAGE

BACKGROUND OF THE INVENTION

1. Field of the Invention

The present invention relates to the field of food product packaging, and more particularly to a novel fragile food product package employable as a serving bowl and suitable for stacking in a protective load-carrying form.

2. Brief Description of the Prior Art

In the past, it has been the conventional practice to serve food in a rigid, non-breakable bowl composed of metal or plastic so that it was convenient to hold the food during consumption of a meal. These bowls are not edible and are of heavy construction. Other bowls or shells are made from a semi-solid product such as grain, flour or corn materials and are generally formed with a plurality of irregular convolutions in a circular sidewall which is held together by a common base or bottom. These are edible and lightweight. The plurality of convolutions are not of equal diameter and the convolutions are not evenly spaced apart so that the integral strength of the sidewall is only as strong as the weakest convolution or separation between convolutions. Also, the structural integrity of the circular sidewall is adversely affected by providing the surfaces of the sidewall with irregularities so that load distribution is uneven. The same disadvantage is experienced by the common base or bottom which suffers from structural weakness due to surface irregularities and uneven attachment with the irregular convolutions of the sidewall.

Because of the fragile and non-reinforced sidewall construction, it is difficult to stack or nest a plurality of such edible shells together for shipment or transportation from place to place. Inasmuch as the convolutions of standard bowls or shells are uneven, a plurality of such bowls or shells cannot be placed in stacked alignment for space-saving purposes which would normally permit easy packaging. Also, inasmuch as the sidewall is weakened, breakage frequently occurs due to uneven distribution of impact or shock loads so that packaging and shipping in quantity presents a difficult problem. Some prior packaging techniques includes the placement of cushion or spacers between adjacent ones of the bowls or shells so that they do not touch or transfer loads directly. Other attempts may include the provision of elaborate holders, spaces and specially configured trays which are extremely expensive and require assembly procedures. Such procedures do not lend themselves to automatic counting, packaging or handling of a plurality of shells.

When prior attempts have been made to ship or transport stacks of brittle food shells or bowls, impact loads are introduced into the stack from the lowermost bowl in the stack through any cardboard or paper packaging material. These loads are transferred through the entire stack resulting in bowl breakage and damage.

Therefore, a long-standing need has existed to provide a novel fragile bowl or shell package wherein a plurality of such shells may be readily packaged together in a stack for shipment and transportation purposes without breakage.

SUMMARY OF THE INVENTION

Accordingly, the above problems and difficulties are obviated by the present invention which provides a novel fragile food product package for a plurality of shells or bowls composed of edible materials provided with a circular continuous sidewall formed with a plurality of reinforcing evenly spaced-apart convolutions of substantially identical diameter for maximum strength. The external and internal surfaces of the continuous sidewall are provided with a surface texture characterized as being granular and brittle. The common bottom or base connecting and supporting the sidewall may be provided with a circular or annular bead which interconnects the base with the lower part of the continuous sidewall, permitting the sidewall to taper outwardly from the base.

The sidewall of the bowl or shell permits nesting with a multiplicity of other identical shells or bowls so that stacking in space-saving relationship occurs. The stack of bowls, shells or the like engage one another by means of the respective sidewall convolutions and the entire stack is carried in a U-shaped form which is wrapped with a film to unitize the stack of bowls or shells, as disclosed in the application having Ser. No. 07-131,919 now patented 4,873,099.

It is to be noted that other food products may be packaged in accordance with the present concept, such as fragile cups, plates or the like, whether edible or not.

Therefore, it is among the primary objects of the present invention to provide a novel food product package which includes improved load-carrying capabilities so that fragile articles stacked together will not buckle, tear, shatter or break apart under normal shipping, transport or usage conditions.

Another object of the present invention is to provide a novel edible food product package that lends itself for stacking in a nested manner with a plurality of other fragile products so that space is conserved in the resultant package and wherein the sidewall of each stack is held in a load-carrying form to prevent transfer of applied impact loads into the stacked products.

Another object of the present invention is to provide a novel food product package for a plurality of bowls which includes even and regular appearing convolutions on each bowl which not only reinforce the strength of the bowl but which permit ready stacking of bowls into a nested package within a load-absorbing form for shipping and transportation purposes.

Still a further object of the present invention is to provide a novel fragile food product which is adapted for automation purposes during production and handling including automatic assembly and packaging for shipment as a unitized package.

Yet another object is to provide a package for fragile items that includes a U-shaped form substantially enclosing a plurality of such items so that applied impact forces and loads are distributed away from the items through the structure of the form per se.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 5 is a front perspective view illustrating a plurality of fragile food product shells nested into a novel protective and unitized package incorporating the present invention using the food product shell illustrated in FIGS. 1 and 2;

FIG. 6 is an exploded perspective view showing assembly of a plurality of food product shells resulting in the package of FIG. 5;

FIG. 7 is a front perspective view illustrating another version of food product package incorporating a plurality of fragile shells of the version shown in FIGS. 1 and 2;

FIG. 8 is an exploded perspective view showing the assembly of food product shells resulting in the novel package of FIG. 7; and FIG. 9 is a reduced front elevational view of the novel package shown in FIG. 5 with arrows indicating applied load-bearing characteristic upon impact.

DESCRIPTION OF THE PREFERRED EMBODIMENT

Figure 1:
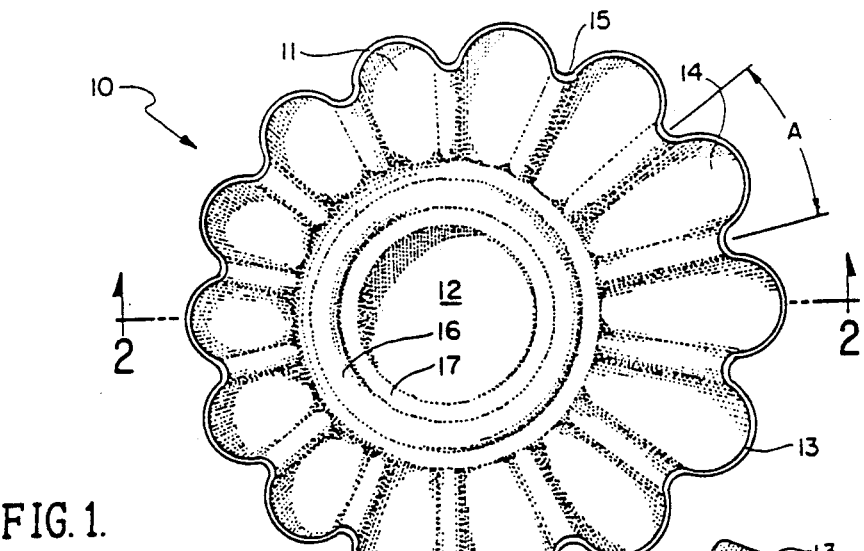
FIG. 1 is a top plan view of a novel food product representing a fragile item susceptible to breakage when stacked for shipment.
Figure 2:
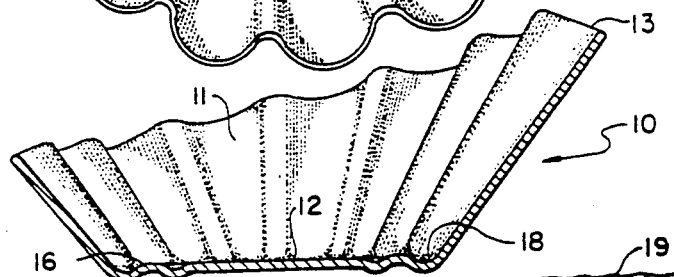
FIG. 2 is a transverse cross-sectional view of the food product shown in FIG. 1 taken in the direction of arrows 2—2 thereof.
Figure 2A:
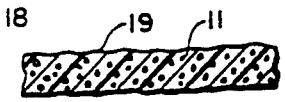
FIG. 2a is an enlarged cross-sectional view of the fragile food item shown in FIG. 2.

A fragile food product used in the novel package of the present invention is indicated in the general direction of arrow 10 in FIGS. 1 and 2. The food product illustrated is in the form of a bowl or shell into which food, such as salad, may be placed. The bowl is composed of an edible or consumable material which is prepared from suitable digestible foods and ingredients, such as grain, flour or corn, which are subject to forming and baking or heating so that the food ingredients bind together into the particular shape shown in the FIGURES. Therefore, it is to be understood that the shell or bowl is to be eaten by a consumer and that the shell or bowl includes a specific and critical shape and configuration necessitated by the employment of edible and digestive materials which are not noted for structural integrity.

With respect to the shape and configuration, the food product is rigid to the point of being brittle for easy break-away and reinforced so that the product is stable and not only constitutes an edible product but a shell product which may be readily combined with other shells into a package for transportation or shipment under load. The specific configuration presents a reinforced product which will not crumble or break when packaged for shipment, and yet the composition of the product is fragile because it is made of edible food product ingredients. Obviously, this edible product cannot be made from metal, plastic or the like. Other food products may be packed by nesting or stacking together other than shells or bowls. For example, cups plates or the like may be packed, as will be described later.

The improvements are illustrated in FIGS. 1 and 2 wherein a continuous thin and brittle sidewall 11 is arranged in a circular fashion about a supporting thin and brittle bottom 12 wherein the continuous sidewall outwardly tapers or diverges from the bottom 12 to terminate in a continuous edge 13. It is also to be noticed that the sidewall 11 is provided with a plurality of convolutions, such as convolution 14, having a specific width indicated by A in FIG. 1. The plurality of convolutions substantially radiate upwardly and outwardly from the bottom 12 in fixed spaced-apart relationship. The convolutions are of a semicircular configuration and the diameter of each circular convolution is substantially identical so that uniformity of convolutions extends about the total sidewall. It is the regular and even construction of the convolutions that greatly assists in reinforcing the sidewall 11. Therefore, the respective convolutions 14 are substantially identical and the interconnecting area indicated by numeral 15 between convolutions is also substantially identical about the sidewall 11.

The edible bottom 12 may be reinforced by annular beads represented by numerals 16 and 17 which are coaxially disposed with respect to the circular integral joint 18 with the bottom of the sidewall 11. Therefore, reinforcement is achieved in the sidewall by the plurality of identically formed convolutions 11 with their identically formed connection portions 15 and the reinforcement of the bottom 12 is achieved by the annular beads, such as 16 and 17. It is to be understood that the external and internal surfaces of the shell are provided with a surface texture indicative of a food product so that the thickness of the product is substantially constant but grainy throughout. The food product bowl or shell is integrally formed without any reduced thickness caused by surface irregularities or uneven convolutions or joining areas. The surface texture 19 is provided by the actual presence of edible food ingredients employed in the composition of the sidewall and bottom.

In the embodiment shown in FIGS. 1 and 2, the height of the sidewall 11 is varied so that the edge 13 is provided with a scalloped edge and the height is different along its circular configuration and a stack of nested bowls or shells 10 is included in the package shown in FIGS. 7 and 8.

Figure 3:
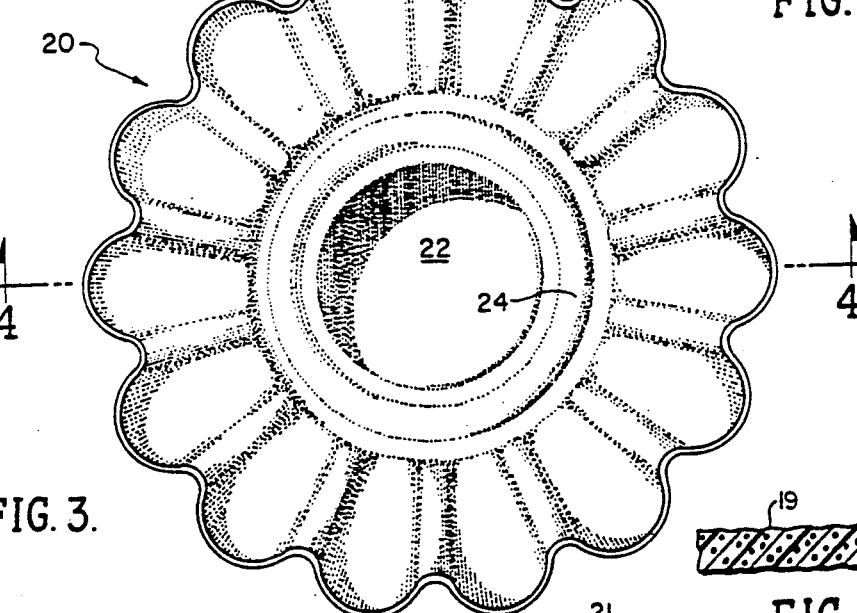
FIG. 3 is a top plan view illustrating another version of the fragile food product.
Figure 4A:
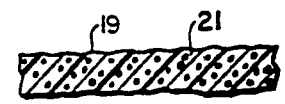
FIG. 4a is an enlarged cross-sectional view of the fragile food item shown in FIG. 4.
Figure 4:
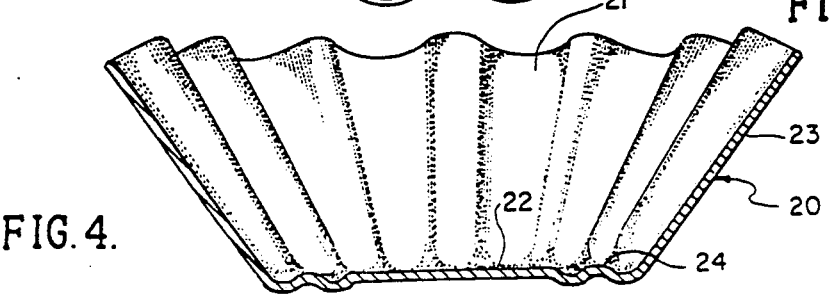
FIG. 4 is a transverse cross-sectional view of the food product as taken in the direction of arrows 4—4 of FIG. 3.

Referring now in detail to FIGS. 3 and 4, another version of food product bowl or shell is illustrated in the direction of arrow 20 which is substantially similar to the embodiment shown in FIGS. 1 and 2 with the exception that a sidewall 21 is of substantially the same height from the bottom 22. The shell or bowl 20 includes a sidewall 23 which is substantially coaxially disposed with respect to the bottom 22 and the plurality of convolutions are evenly spaced wherein each convolution is of the same diameter. The bottom or base 22 includes coaxially disposed integrally formed beads, such as bead 24 that reinforces the base and a smooth textured surface is provided both externally and internally to aid in reinforcing the sidewall and base. A stack of bowls or shells 20 is included in the package of FIGS. 5, 6 and 9.

The bowl or shell, whether it be the version shown in FIGS. 1 and 2 or the version shown in FIGS. 3 and 4, is nestable so as to provide a stack that may be confined together under load in a structure or form for transportation and shipping purposes. The individual bowls or shells are nestable because of the constant diameter between convolutions as well as the convolutions themselves. The structural integrity of the bowls or shells is enhanced by the evenly located convolutions and interconnecting portions, as well as the textured surface so that a plurality of the bowls or shells may be placed against one another in a stack so as to provide an even load distribution which resists cracking or damage to the rigid and brittle sidewall or bottom of the fragile bowl or shell. By employment of a load-bearing structure or form 31 or combined 40, 41, no damaging load forces are transmitted through the stack. of fragile food product.

Referring now in detail to FIG. 5, the plurality of shells or bowls, as shown in FIGS. 3 and 4, are arranged in such a stack and the stack is placed in a "U-shaped" structure or form or carrier indicated by numeral 30. The carrier 30 comprises a base 31 having upright sides 32 and 33 wherein the opposing surfaces of the base and sides define a cavity into which the stack of bowls or shells represented by numeral 34 is placed. The stack and carrier are then wrapped in a clear plastic material, indicated by numeral 35, which is heated or otherwise shrunk so as to hold the stack 34 in intimate contact with the carrier 30. The exposed corners of the sides 32 and 33 are chamfered, such as indicated by numeral 36, so that the wrapping 35 may more closely extend into the storage cavity between the opposing surfaces of sides 32 and 33. The wrapping 35 may be of any suitable shrink wrap film or material which will hold the package in an integral and unitary construction.

Numerals 50 and 51 represent end portions of each side 32 and 33 that terminate in an impact, load-absorbing edge or edge marginal region adapted to receive any applied impact loads before being introduced into the lowermost bowl or shell of the stack. FIG. 9 illustrates a surface 52 on which the edges of the side end portions rest so that the end portions separate the surface from the lowermost food product bowl or shell in the stack. Therefore, any impact loads or load forces generated via the surface 52 are transmitted directly into the structure or form 30. The arrows in the drawing indicate the flow of load forces through the form 30 to the exclusion of the food product stack. The film wrapping 35 not only encloses the stack and form but totally supports the stack during shipping and handling. A space or an air gap is present between the exposed inner surface of the film wrap and the stack. The shrinking of the film wrap forcibly urges the stack into the storage cavity of the structure or form 30 so that the uppermost bowl or shell is held in pressed contact against the opposing base 31. The impact load forces travel through the construction of the structure or form 30 since the thin plastic shrink film wrap is not a load-carrying member. Preferably, the form is composed of a cardboard with an inner core of corrugated paper or the like. However, a sheet of thickened pressed paper or rag fibers will serve to distribute applied load forces. The U-shape of the form 30 provides a generally circular path with the surface 52 to conduct the load forces around the stack without passing through the stack.

Referring now to FIG. 6, an exploded view illustrates the assembly of plurality of food product bowls or shells 20 into an inverted form or carrier 30. Each bowl or shell of the plurality is placed on top of each other in order to provide a stack which is indicated by the numeral 37 so that the base of shell intended to be the uppermost shell will bear against the base 31 of the form. Such an arrangement is possible since adjacent shells or bowls may be nested together due to the fact that each shell incorporates the identical shape and configuration of adjacent bowls or shells. Next, the stack of bowls or shells is introduced into the cavity between the opposing surfaces of sides 32 and 33 of the structure, form or carrier 30. Once assembled, the assemblage is then wrapped with a transparent film 35 to provide a unitary package. The form or carrier 30 is shown in its inverted position for assembly purposes. However, when the package is shipped or handled, the package is in the position shown in FIG. 5.

Referring to FIGS. 7 and 8, a package of bowls or shells having the configuration of the bowl or shell shown in FIGS. 1 and 2 is illustrated. The package is indicated in the general direction of arrow 38 which represents a fully assembled and unitized construction. In this package, a pair of conical members 40 and 41 is placed at the top and bottom of the stack, as indicated by numeral 42. Conical form 40 is introduced into the interior of the bowl while conical form or member 41 is placed around the external surface of the bottom bowl or shell of the stack. Once so arranged, a transparent film is placed around the forms 40 and 41 and the stack, and using heat shrink techniques, the film is reduced to hold the package together in a unitary construction.

Referring to FIG. 8, it can be seen that the conical forms 40 and 41 include an adjustment means indicated in both instances by numeral 43 whereby the diameter of the conical members may be adjusted to form fit with the interior of the bowls or shells. After the plurality of the bowls or shells have been stacked into the arrangement indicated by numeral 42, the upper form 40 is adjusted by means 43 to form fit with the interior of the topmost bowl or shell while the lower conical form 41 is adjusted to fit the exterior configuration of the lowermost bowl or shell in the stack. Once so assembled, the film may be wrapped about the package and reduced to provide the unitary configuration.

Therefore, it can be seen that the individual and fragile wall construction of the bowls, cups, cones or the like of the invention are reinforced by means of the regular convoluted configuration in cooperation with the textured exterior and interior surfaces in conjunction with the reinforced ribbing of the bases or bottom. Such reinforcement is not usual or needed in the normal production of a food product. Reinforcement of the sidewall and the base or bottom is critical so that a multiplicity of the bowls or shells may handle applied loads. Therefore, no spacers or cushion material are needed as separators between adjacent ones of the bowls or shells arranged in a stack. The surrounding film which wraps a package, including the carriers, is not substantially touched or engaged by the wrapping film so that the carrier itself carries the load of the film in its reduced or shrunken state. By this means, the food product bowl or shell is completely protected and reinforced so as to withstand the rigors of shipment, as well as the rigors of handling individually. Also, it is to be understood that the composition of each bowl or shell is definitely to be considered a food product since it is intended and expected to be consumed by a person so that its composition is completely digestible.

The inventive concept is not intended to cover metal, plastic or other non-digestible materials which rely upon their structural wall thickness and non-brittle characteristics to achieve structural strength wherein the shape or configuration of the material into a shaped mold is for purposes of design having nothing to do with structural loading or its ability to withstand rough handling and usage.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a package for shipping and handling of a plurality of fragile food product items, the combination which comprises:
   a plurality of fragile food product items arranged in an end-to-end series terminating at opposite ends with a lowermost and an uppermost food product item;
   form means supporting said series of food product items in a nested stack;
   said form means constituting a load-bearing member of U-shaped configuration having a base with upstanding sides on opposite ends of said base arranged in spaced-apart relationship defining a storage cavity between opposing surfaces of said sides;
   said storage cavity occupied by said nested stack of said food product items with said uppermost food product item immediately below the terminating ends of said sides;
   a heat shrinkable film surrounding said nested stack of said food product items and said form means for holding said food product items in a unitary construction;
   said uppermost food product item bears against said form means base and is forcibly urged thereagainst by said film;
   said form means sides include spaced-apart end portions terminating in load-absorbing edge marginal regions adapted to conduct applied impact load forces into said form means sides and said base;
   said form means side end portions include strain relief means about which said film bears against as said transverses between said sides.

2. The invention as defined in claim 1 wherein:
   said film completely covers said form and said nested stack and partially occupies an area defined between opposite surfaces of said U-shaped form sides when reduced by shrinking so as to forcibly engage with said lowermost one of said food product items in said nested stack.

3. The invention as defined in claim 2 wherein:
   said shrinkable film follows the external configuration of said form and reduces in its dimension to enter into said area to define an air space between said film and said nested stack.

4. The invention as defined in claim 3 wherein:
   said shrinkable film having a non-operative condition when unheated and an operative condition of reduced dimension when heated;
   said film operably holding said nested stack and said form together and sealing said nested stack from ambient atmosphere when in its operative condition.

5. The invention as defined in claim 4 wherein:
   said form sides constituting a pair of sidewalls projecting from opposite ends of said base so that said terminating end portions extend beyond said nested stack in position to receive and absorb impact loads and shocks to the exclusion of said nested stack.

6. In a package for shipping and handling of a plurality of fragile food product items, the combination which comprises:
   a plurality of fragile food product items arranged in an end-to-end series terminating at opposite ends with a lowermost and an uppermost food product item;
   form means supporting said series of food product items in a nested stack;
   said form means constituting a load-bearing member of U-shaped configuration having a base with upstanding sides on opposite ends of said base arranged in spaced-apart relationship defining a storage cavity between opposing surfaces of said sides;
   said storage cavity occupied by said nested stack of said food product items with said uppermost food product item immediately below the terminating ends of said sides;
   a heat shrinkable film surrounding said nested stack of said food product items and said form means for holding said food product items in a unitary construction;
   said uppermost food product item bears against said form means base and is forcibly urged thereagainst by said film;
   said form means sides include spaced-apart end portions terminating in load-absorbing edge marginal regions adapted to conduct applied impact load forces into said form means sides and said base;
   said form means side end portions have chamfered corners about which said film transverses between said sides and said film forcibly engages with said lowermost one of said food product items in said nested stack;
   an air space is defined between said film and said nested stack;
   said form means provides a substantially endless load force conducting path about said nested stack of food product items;
   said food product item includes:
      an edible shell consisting of a circular base integrally supporting an upwardly and outwardly projecting continuous sidewall and being totally composed of a digestible material;
      said base provided with at least one annular reinforcement bead coaxially disposed with respect to said circular sidewall;
      said circular sidewall having a plurality of semicircular convolutions of equal diameter integrally provided about said circular base, each of said semicircular convolutions having a central axis radiating upwardly and outwardly from said circular base;
      said semicircular convolutions and said base annular bead cooperating to provide combined reinforcement applied load-carrying characteristics;
      said convolutions of equal diameter are provided in a series in adjacent side-by-side relationship; and
      said continuous sidewall angles outwardly to diverge from said circular base and having a roughened exterior surface contributing to said load-carrying characteristics wherein said continuous sidewall and base resists breakage, damage and separation.

7. A consumable food product comprising:

an edible food shell consisting of a circular base integrally supporting an outwardly projecting breakaway continuous sidewall;

said shell including said base and said sidewall characterized as composed of a brittle and digestible material with said base and said sidewall of thin cross-sectional construction having a high strength-to-weight ratio;

said shell base and said sidewall further having external exposed granular surface texture characteristic of said digestible material carried on the interior and exterior surface of said shell;

said base being coaxially disposed with respect to said circular sidewall and in integral connection therewith;

said circular sidewall having a plurality of semicircular convolutions of equal diameter integrally provided about said circular base, each of said semicircular convolutions having a central axis radiating outwardly from said circular bas-connection with said sidewall; and said semicircular convolutions and said base cooperating to provide reinforcement and applies load-carrying characteristics.

* * * * *

UNITED STATES PATENT AND TRADEMARK OFFICE
CERTIFICATE OF CORRECTION

PATENT NO. : 5,128,157
DATED : July 7, 1992
INVENTOR(S) : MARK R. RUIZ

It is certified that error appears in the above-identified patent and that said Letters Patent is hereby corrected as shown below:

Column 7, Line 43; insert the word --film-- before the word "transverses"

Signed and Sealed this

Fifth Day of July, 1994

Attest:

BRUCE LEHMAN

Attesting Officer

Commissioner of Patents and Trademarks